Patented Apr. 12, 1927.

1,624,724

UNITED STATES PATENT OFFICE.

HAROLD WALTER ELLEY, OF WILMINGTON, DELAWARE, ASSIGNOR TO E. I. DU PONT DE NEMOURS & COMPANY, OF WILMINGTON, DELAWARE, A CORPORATION OF DELAWARE.

RUBBER COMPOSITION AND METHOD OF PREPARING SAME.

No Drawing.  Application filed May 5, 1926. Serial No. 106,969.

This invention relates to a new and improved rubber composition. More particularly it is concerned with a method of increasing the resistance of rubber compounds to the deleterious effects of aging, and with the resulting product.

It has been demonstrated that the deterioration of rubber articles on aging is caused by oxidation. Various products have been suggested for preventing this effect. Such materials are referred to in U. S. Patent Nos. 1,496,792, 1,515,642, 1,532,-398 and 1,556,415. Moreover, additional information relative to the preservation of rubber products has been disclosed in German Patent No. 366,114 and in English Patent No. 142,083.

The majority of the compounds disclosed in the patents cited above possess no practical value because they exert only mild anti-aging properties, are unstable, cause discoloration, possess bad physiological properties, are not readily dispersed in the rubber, or are too costly.

I have discovered a new class of compounds that is uniquely adapted for use in preventing the deterioration of rubber compounds on aging.

The compounds referred to are the nitro amino hydroxy derivatives of aromatic hydrocarbons. Specifically, para-nitro-ortho-amino phenol functions in a very desirable manner and, because of its availability, it is of great economic importance. It is a stable product, having no bad physiological properties. I will therefore describe my invention with particular reference thereto.

Although p-nitro-o-amino phenol exhibits an anti-oxidant effect in various rubber stocks it somewhat retards the cure when used in stocks containing accelerators such as diorthotolylguanidine or diphenyl diethyl thiuram disulphides, respectively. The aging quality of the rubber is, nevertheless, improved. When used in a stock containing an acidic accelerator such as mercato benzo thiazole or derivatives thereof, as p-ethoxy-mercapto-benzo-thiazole or benzoyl-mercapto-benzo-thiazole, no retarding effect is notable and the oxidation is effectually prevented.

The following example will illustrate the conditions under which p-nitro-o-amino phenol may be used in a stock containing mercapto benzo thiazole and indicates the improved aging effects which result. The parts are indicated in terms of weight in the formula below:

| | |
|---|---|
| Smoked sheets | 50 |
| Amber crepe | 50 |
| Zinc oxide | 18.15 |
| Sulfur | 2.75 |
| Mercapto benzo thiazole | .75 |
| p-Nitro-o-amino phenol | 2.00 |

The ingredients were well mixed by ordinary methods of rubber compounding. The resulting stock was cured under a pressure of 20 pounds of steam for 30 minutes. After curing, it was tested together with a compound prepared from the same stock, but without the anti-oxidant, to determine by the comparative tensile strengths the effects of aging on the two compounds. The tension at the breaking points of the variously aged compositions is shown below in terms of pounds per square inch:

Test for tensile strength.

| Degree of exposure. | Stock containing anti-oxidant. | Same stock without anti-oxidant. |
|---|---|---|
| Before aging | 3555 | 3415 |
| Aged 1 day at 100° C | 4305 | 2998 |
| Aged 2 days at 100° C | 3850 | 3060 |
| Aged in air oven— | | |
| 4 days at 90° C | 3890 | 3290 |
| 6 days at 90° C | 1985 | 1235 |

It is obvious from the above data that para-nitro-ortho-amino phenol imparts superior aging properties to the rubber.

While this example shows the excellent properties of para-nitro-ortho-amino phenol in preventing the oxidation and deleterious effects of the aging of rubber, it is not my intention to be limited to this particular compound. It is to be understood that the example is purely illustrative of the employment of the nitro amino hydroxy bodies as a class which embraces, for example, 3-nitro-5-amino-ortho-cresol and 2-nitro-4-amino-alpha-naphthol.

Also, it will be understood that my process is not limited to the treatment of caoutchouc but is adapted for the treatment of rubber substitutes as well, including balata and gutta-percha. Other well-known curing agents than sulfur, likewise, may be employed and the conditions of curing may, of course, be varied. For example, I may employ the well-known cold process of curing.

I claim:

1. The method of protecting a composition comprising rubber from oxidation which method comprises the incorporation into said composition of an aryl compound containing nitro, amino and hydroxy groups.

2. The method of protecting a rubber composition from the effects of aging which method comprises incorporating an aryl compound containing nitro, amino and hydroxy groups into the rubber stock prior to vulcanization.

3. The process of producing an age resisting rubber composition comprising incorporating an aryl compound containing nitro, amino and hydroxy groups into a rubber stock together with a curing agent and then curing said stock.

4. The process of producing an age resisting rubber composition which comprises incorporating into a rubber stock an aryl compound containing nitro, amino and hydroxy groups a vulcanizing agent and an accelerator and then vulcanizing said stock.

5. The method of protecting a composition comprising rubber from oxidation which method comprises the incorporation into said composition of p-nitro-o-amino phenol.

6. The process of producing an age resisting rubber composition which comprises incorporating into a rubber stock p-nitro-o-amino phenol and a curing agent and then curing said stock.

7. The process of producing an age resisting rubber composition which comprises incorporating into a rubber stock p-nitro-o-amino phenol, a vulcanizing agent and an accelerator and then vulcanizing the resulting mixture.

8. The process of producing an age resisting rubber composition which comprises incorporating into a rubber stock p-nitro-o-amino phenol, a vulcanizing agent and a mercapto-benzo-thiazole compound and then vulcanizing the resulting mixture.

9. The process of producing an age resisting rubber composition which comprises incorporating into a rubber stock p-nitro-o-amino phenol, a vulcanizing agent and mercapto-benzo-thiazole and then vulcanizing the resulting mixture.

10. A rubber compound comprising an aryl compound containing nitro, amino and hydroxy groups.

11. A rubber composition comprising cured rubber and an aryl compound containing nitro, amino and hydroxy groups.

12. A vulcanized rubber product containing p-nitro-o-amino phenol.

13. A composition containing rubber and p-nitro-o-amino phenol.

14. A rubber product resulting from the curing of a mixture comprising p-nitro-o-amino phenol, an accelerator, rubber and a vulcanizing agent.

15. A rubber product resulting from the curing of a mixture comprising p-nitro-o-amino phenol, a mercapto-benzo-thiazole compound, rubber and a curing agent.

In testimony whereof I affix my signature.

HAROLD WALTER ELLEY.